(12) United States Patent
Barratt et al.

(10) Patent No.: US 12,345,805 B2
(45) Date of Patent: Jul. 1, 2025

(54) PROXIMITY DETECTION SYSTEM

(71) Applicant: INSIGHT SIP, Grasse (FR)

(72) Inventors: Christopher Barratt, Sophia-Antipolis (FR); Michel Beghin, Sophia-Antipolis (FR); Philippe Genin, Sophia-Antipolis (FR)

(73) Assignee: INSIGHT SIP, Grasse (FR)

( * ) Notice: Subject to any disclaimer, the term of this patent is extended or adjusted under 35 U.S.C. 154(b) by 433 days.

(21) Appl. No.: 17/925,500

(22) PCT Filed: May 26, 2021

(86) PCT No.: PCT/EP2021/064109
§ 371 (c)(1),
(2) Date: Nov. 16, 2022

(87) PCT Pub. No.: WO2021/244924
PCT Pub. Date: Dec. 9, 2021

(65) Prior Publication Data
US 2023/0341541 A1 Oct. 26, 2023

(30) Foreign Application Priority Data
Jun. 1, 2020 (EP) ................................. 20315291

(51) Int. Cl.
*H04L 1/00* (2006.01)
*G01S 11/06* (2006.01)
(Continued)

(52) U.S. Cl.
CPC ............... *G01S 13/86* (2013.01); *G01S 11/06* (2013.01); *G01S 13/76* (2013.01); *H04B 1/005* (2013.01)

(58) Field of Classification Search
CPC ........ G01S 7/354; G01S 7/006; G01S 13/003; G01S 13/74; G01R 31/025; H04W 24/08;
(Continued)

(56) References Cited

U.S. PATENT DOCUMENTS

| | | | |
|---|---|---|---|
| 2010/0321245 A1 | 12/2010 | Aoki | |
| 2011/0117869 A1* | 5/2011 | Woodings | H04W 24/00 455/226.4 |
| 2020/0191943 A1* | 6/2020 | Wu | G01S 13/726 |

FOREIGN PATENT DOCUMENTS

| | | |
|---|---|---|
| EP | 1261228 A2 | 11/2002 |
| JP | S63317795 A | 12/1988 |
| JP | 2018004318 A | 1/2018 |

OTHER PUBLICATIONS

International Search Report and Written Opinion issued in corresponding International Application No. PCT/EP2021/064109, mailed Jul. 5, 2021, pp. 1-7, European Patent Office, Rijswijk, Netherlands.

* cited by examiner

*Primary Examiner* — Phuoc H Doan
(74) *Attorney, Agent, or Firm* — HAUPTMAN HAM, LLP

(57) ABSTRACT

A system for detecting proximity between a first transceiver and a second transceiver. Each of the first and the second transceivers includes at least one primary and secondary radio module. The primary radio module of the first transceiver is able to communicate with the primary radio module of the second transceiver, and the secondary radio module of the first transceiver is able to communicate with the secondary radio module of the second transceiver. The first and the second transceivers are configured to estimate a primary communication distance between the primary radio module of the first transceiver and the primary radio module of the second transceiver, and estimate a secondary communica- (Continued)

tion distance between the secondary radio module of the first transceiver and the secondary radio module of the second transceiver.

14 Claims, 5 Drawing Sheets

(51) Int. Cl.
*G01S 13/76* (2006.01)
*G01S 13/86* (2006.01)
*H04B 1/00* (2006.01)

(58) Field of Classification Search
CPC ..... H04W 24/10; H04W 16/14; H04W 84/12; H04B 17/318; H04L 67/147
See application file for complete search history.

PROXIMITY DETECTION SYSTEM

The present application is a U.S. National Phase of International Application Number PCT/EP2021/064109, filed May 26, 2021, which claims priority to European Application No. 20315291.3, filed Jun. 1, 2020, the entirety of which is incorporated herein by reference.

TECHNICAL FIELD

The present invention relates to the field of proximity detection systems. It finds a particularly advantageous application in the field of mobile systems for detecting proximity relative to another on-board system.

PRIOR ART

There are many techniques for estimating a distance between several objects. However, this becomes complicated if the objects in question are movable, or even mobile. Under such conditions where the system and energy resources are greatly limited, many trade-offs are necessary.

Thus, we often end with systems in which the measured distances are either uncertain or not very accurate.

In the era of connected objects, and the concept of social distance, it should be understood that the ability to estimate a distance in an accurate, reliable, repeatable manner and with low energy consumption is a major issue.

Hence, an object of the present invention is to provide a solution addressing at least partly these various technological and social challenges.

The patent publication US 2010/321245 A1 describes a proximity detection system. The document JP S63 317795 A discloses a distance detecting system for a motor vehicle. The document JP 2018 004318 A relates to a short distance measuring device. The patent publication EP 1261228 A2 relates to a radio-communication system.

Other objects, features and advantages of the present invention will become apparent upon examining the following description and the appended drawings. It should be understood that other advantages may be included.

SUMMARY

To achieve this objective, according to one embodiment, a system is provided for detecting proximity between at least one first, preferably mobile, transceiver and at least one second, preferably mobile, transceiver, the first transceiver and the second transceiver each comprising at least one primary radio module and one secondary radio module, the system being characterised in that:
  the primary radio module of the first transceiver is able to communicate with the primary radio module of the second transceiver, according to a first frequency band and according to a first amplitude;
  the secondary radio module of the first transceiver is able to communicate with the secondary radio module of the second transceiver, according to a second frequency band, different from the first frequency band, and according to a second amplitude, different from the first amplitude;
the first transceiver and the second transceiver being configured:
  when the primary radio module of the first transceiver and the primary radio module of the second transceiver approach each other by getting under a primary communication distance, to estimate a primary distance value between the primary radio module of the first transceiver and the primary radio module of the second transceiver from a measurement of the strength of at least one signal received by the primary radio module of the first transceiver from the primary radio module of the second transceiver; and,
  if the estimated primary distance value falls below a secondary communication distance between the secondary radio module of the first transceiver and the secondary radio module of the second transceiver:
    to estimate a secondary distance value between the primary radio module of the first transceiver and the primary radio module of the second transceiver from at least one measurement of the transmission time of a signal transmitted from the secondary radio module of the first transceiver to the secondary radio module of the second transceiver; and,
    if the estimated secondary distance value is less than a predetermined notification distance, to estimate a degree of nearness, and preferably to notify a proximity detection if the degree of nearness is greater than a predetermined threshold.

It allows, when the transceivers are worn by users, informing the users as soon as they are too close to one another.

This allows using a first radio communication technology for the estimation of some distances, then a second radio communication technology for the estimation of shorter distances.

This allows taking advantage of two radio communication technologies depending on the distance conditions.

Advantageously, the system uses a primary communication module configured for communication in a wide frequency band and with low energy consumption. This primary radio module enables a first estimation of the distance between the transceivers.

In addition, and in a clever manner, the secondary radio module takes over the estimation of the distance when the transceivers are closer to each other, in order to obtain greater accuracy via secondary radio modules that are more energy-consuming but provide greater accuracy.

By using two different radio communication technologies, the present invention allows a first distance estimation in a first range, and a second distance estimation in a second range, the first distance range being wider than the second distance range.

According to one embodiment, a transceiver, preferably mobile, is also provided, configured to detect a proximity distance with at least one second transceiver selected from among a plurality of transceivers, the transceiver comprising at least:
  a primary radio module configured to communicate with at least one primary radio module of the second transceiver according to a first frequency band and according to a first amplitude;
  a secondary radio module configured to communicate with at least one secondary radio module of the second transceiver according to a second frequency band, different from the first frequency band, and according to a second amplitude, different from the first amplitude;
the transceiver being configured:
  when its primary radio module and the primary radio module of the second transceiver approach each other while getting under a primary communication distance, to estimate a primary distance value between the primary radio module of the first transceiver and the primary radio module of the second transceiver from a measurement of the strength of at least one signal received by the primary radio module of the first transceiver from the primary radio module of the second transceiver; and, if the estimated primary distance value falls below a secondary communication distance between its secondary radio module and the secondary radio module of the second transceiver:

to estimate a secondary distance value between its primary radio module and the primary radio module of the second transceiver from at least one measurement of the transmission time of a signal transmitted from its secondary radio module to the secondary radio module of the second transceiver; and, if the estimated secondary distance value is less than a predetermined notification distance, to estimate a degree of nearness, and preferably to notify a proximity detection if the degree of nearness is greater than a predetermined threshold.

According to one embodiment, a bracelet device comprising at least one transceiver according to the present solution is also provided.

According to one embodiment, a method is also provided for detecting proximity between a first, preferably mobile, transceiver and at least one second, preferably mobile, transceiver, the first transceiver and the second transceiver each comprising at least one primary radio module and one secondary radio module, the primary radio module of the first transceiver being configured to communicate with at least the primary radio module of the second transceiver according to a first frequency band and according to a first amplitude, the secondary radio module of the first transceiver being configured to communicate with at least the secondary radio module of the second transceiver according to a second frequency band, different from the first frequency band, and according to a second amplitude, different from the first amplitude, the method comprising at least the following steps:

detection by the primary radio module of the first transceiver of the primary radio module of the second transceiver;

when the primary radio module of the first transceiver and the primary radio module of the second transceiver approach each other by getting under a primary communication distance, estimation, by the first transceiver, of a primary distance value between the primary radio module of the first transceiver and the primary radio module of the second transceiver based on a measurement of the strength of at least one signal received by the primary radio module of the first transceiver from the primary radio module of the second transceiver;

if the estimated primary distance value falls below a secondary communication distance between the secondary radio module of the first transceiver and the secondary radio module of the second transceiver, detection by the secondary radio module of the first transceiver of the secondary radio module of the second transceiver; then estimation, by the first transceiver, of a secondary distance value between the secondary radio module of the first transceiver and the secondary radio module of the second transceiver based on at least one measurement of the transmission time of a signal transmitted from the secondary radio module of the first transceiver to the secondary radio module of the second transceiver.

If the estimated secondary distance value is less than a predetermined notification distance, estimation of a degree of nearness, by the first transceiver, and preferably, notification of a proximity detection, by the first transceiver, if the degree of nearness is greater than a predetermined threshold.

According to one embodiment, a computer program product is also provided comprising instructions, which, when executed by at least one processor, executes at least the steps of the method according to the present solution.

BRIEF DESCRIPTION OF THE FIGURES

The aims, objects, and the features and advantages of the invention will appear better from the detailed description of an embodiment thereof which is illustrated by the following appended drawings wherein.

Figure 1:
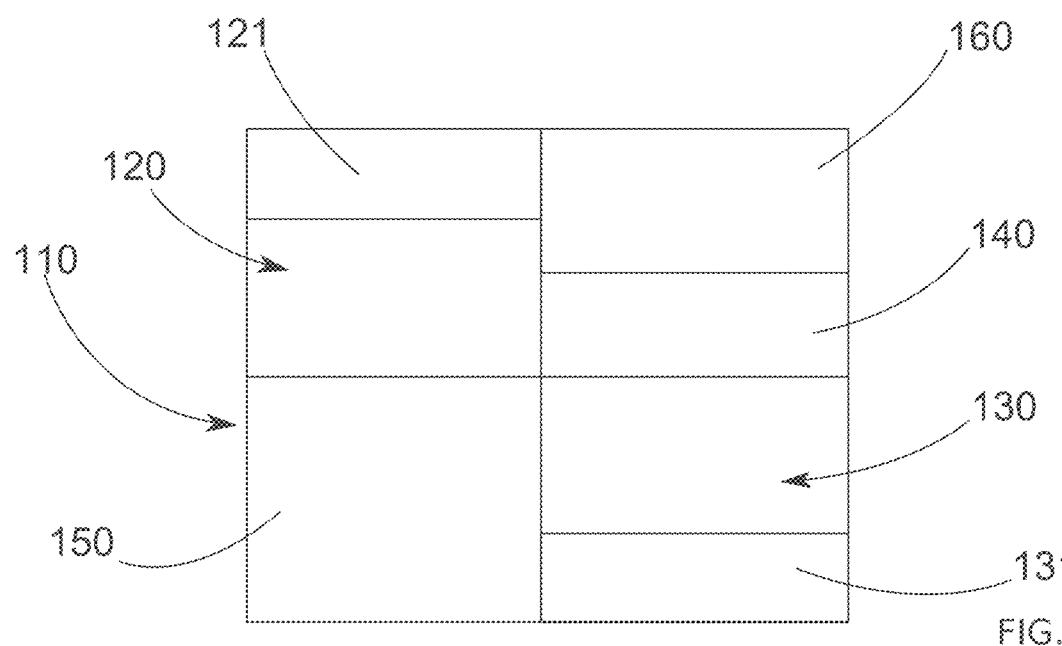
FIG. 1 represents a diagram of a transceiver according to an embodiment of the present invention.

The drawings are given as examples and do not limit the invention. They form schematic representations of principle intended to facilitate understanding of the invention and are not necessarily to the scale of practical applications. In particular, the dimensions are not representative of reality.

DETAILED DESCRIPTION

Before starting a detailed review of embodiments of the invention, optional features are set out hereinafter which may possibly be used in combination or alternatively:

According to one example, the first frequency band has a width less than a width of the second frequency band.

According to one example, the first frequency band has a width and the second frequency band has a width, the ratio between the width of the second frequency band and the width of the first frequency band is greater than 50, preferably greater than 100 and advantageously greater than 250.

According to one example, the width of the first frequency band is less than 2 MHz, preferably less than 1.5 MHz and advantageously less than 1 MHz.

According to one example, the width of the second frequency band is greater than 500 MHz, preferably greater than 750 MHz and advantageously greater than 1,000 MHz.

According to an example, the first amplitude is greater than the second amplitude.

According to one example, the ratio between the first amplitude and the second amplitude is greater than 10, preferably than 20 and advantageously than 40.

According to one example, the first amplitude is greater than −10 dBm, preferably than 0 dBm and advantageously than 4 dBm.

According to one example, the second amplitude is less than −15.3 dBm, preferably than −20 dBM and advantageously than −30 dBm.

According to one example, the degree of nearness may comprise at least one of the following parameters: an approach level, a time interval since the crossing of a threshold distance, the crossing of a threshold distance.

According to one example, the communication between the secondary radio module of the first transceiver and the secondary radio module of the second transceiver is a synchronised communication, the synchronisation of this synchronised communication being ensured at least partly by the primary radio module of the first transceiver and by the primary radio module of the second transceiver.

This allows establishing a synchronised communication for the secondary communication throughout the primary communication.

According to one example, the estimated secondary distance value is transmitted to the second transceiver from the primary radio module of the first transceiver to the primary radio module of the second transceiver.

This allows using the secondary radio modules primarily, and preferably only, for measuring the secondary communication distance.

According to one example, the first transceiver is configured, if the estimated primary distance value falls below the secondary communication distance between the secondary radio module of the first transceiver and the secondary radio module of the second transceiver, to stop the estimation of the primary distance value.

According to one example, the primary communication distance is greater than the secondary communication distance, and the secondary communication distance is greater than the notification distance.

According to one example, the notification of the proximity detection comprises at least one from among: a vibration, a sound, a light signal, etc.

According to one example, the transceiver comprises at least one human-machine interaction module configured to enable the notification of the proximity detection, said human-machine interaction module comprising at least one from among: a vibration module, a sound module, a light module, etc.

According to one example, the transceiver comprises at least one electric battery configured to electrically power the transceiver.

According to one example, the transceiver comprises at least one fastening device configured to enable fastening of the transceiver on a user.

The present invention relates to the field of proximity detection, in particular of nearness between devices movable relative to one another, and therefore of their relative proximity. Thus, as a non-limiting example, the present invention finds application in the measurement of the social distance between individuals wearing this type of devices.

For example, the present invention allows estimating the relative distance between devices and then informing the wearer of each device of an excessive proximity when the devices are too close to each other.

Thus, according to one embodiment and as illustrated in FIG. 1 as a non-limiting example, the present invention relates to a transceiver 110. This transceiver 110 is preferably mobile. For example, it may be worn by a user, such as a badge, a bracelet or a belt for example.

More generally, it may also be incorporated in textile elements, in devices such as a watch or a smartphone, etc.

Advantageously, this transceiver 110 is configured to detect a proximity distance with at least one other transceiver 110. This other transceiver 110 can be selected from among a plurality of transceivers 110. Preferably, the transceivers 110 are identical. At least, it preferably proposes each of the communication, energy storage and instruction processing members indicated below. It should be noted that the terms "a second transceiver and "another transceiver" may be interpreted in the same manner.

In particular, and cleverly, the transceiver 110 is configured to be able to estimate its distance relative to a plurality of other transceivers 110, and preferably simultaneously, or at least one after another on a very short time scale relative to the relative movements of the transceivers 110 relative to each other.

According to one embodiment, the transceiver 110 comprises at least:
 a primary radio module 120; this primary radio module is preferably configured to communicate, via an antenna 121, with at least one primary radio module 120 of another transceiver 110 of the plurality of transceivers 110. Advantageously, this communication is bidirectional. According to one embodiment, the primary radio module 120 is configured to communicate according to a first frequency band and according to a first amplitude; advantageously, this first frequency band has a width, i.e. the width of the frequency spectrum of the signals emitted and received by the primary radio module 120. This width is less than 50 MHz and preferably is equal to or less than 1 MHz; preferably, the first amplitude, i.e. the height of the signals emitted and received by the primary radio module 120, is greater than −10 dBm with equivalent isotropic radiated power (EIRP) or with 0.1 mW, and preferably greater than or equal to 0 dBm with equivalent isotropic radiated power or with 1 mW.
 a secondary radio module 130; this secondary radio module 130 is preferably configured to communicate, via an antenna 131, with at least one secondary radio module 130 of another transceiver 110 of the plurality of transceivers 110. Advantageously, this communication is bidirectional. According to one embodiment, the secondary radio module 130 is configured to communicate according to a second frequency band and according to a second amplitude; Advantageously, this second frequency band also has a width, i.e. the width of the frequency spectrum of the signals emitted and received by the secondary radio module 130. This width is greater than 250 MHz and preferably is equal to or greater than 500 MHz; preferably, the second amplitude, i.e. the height of the signals emitted and received by the secondary radio module 130 is less than −15.3 dBm in accordance with standards or 0.03 mW.

According to a preferred embodiment, the width of the first frequency band is less than that of the second frequency band.

According to a preferred embodiment, the first amplitude is greater than the second amplitude.

Advantageously, the transceiver 110 is configured to estimate a primary distance value between its primary radio module 120 and the primary radio module 120 of another transceiver 112 based on a measurement of the strength of at least one signal received by its primary radio module 120 from the primary radio module 120 of the second transceiver 112. Preferably, this estimation takes place when its primary radio module 120 and the primary radio module 120 of the other transceiver 112 approach each other by getting under a primary communication distance 300. Preferably, this primary communication distance 300 corresponds to the distance from which a communication is possible between two primary radio modules 120. A distance between two elements from which these two elements can establish a communication therebetween is called communication distance. The method enabling the establishment of a communication requiring synchronisation and/or pairing of the elements involved in said communication is called synchronisation of a communication.

This estimation, also called measurement, of this primary distance value is preferably carried out by measuring, and preferably by analysing, the strength of at least one signal received by its primary radio module 120 and emitted from the primary radio module 120 of another transceiver 110.

This technique for measuring a distance based on a strength measurement is called RSSI standing for "Received Signal Strength Indication". This technique consists in measuring the strength of a received signal so as to estimate the distance of the emitter by knowing beforehand the original strength of the signal.

In telecommunication, RSSI is a measurement of the strength in reception of a signal received from an antenna. Its utility is to provide an indication on the strength of the received signal. This received signal measurement allows having an idea on the distance between the emitter and the receiver. The accuracy of the distance measurement by RSSI is poor, at best in the range of one meter.

Advantageously, the primary radio module 120 may consist of or comprise a radio module using the so-called "Bluetooth®" protocol or the so-called "Bluetooth® Low Energy" or BLE protocol.

The BLE protocol also called Bluetooth® Smart is a low-power radio communication protocol that emits at 2.4 GHz. BLE products can communicate with each other in compliance with standards defined by the international group Bluetooth SIG.

Via this type of distance measurement technique and advantageously this type of standard, the primary radio module 120 is able to measure the distance separating it from another primary radio module 120. This technique allows for low energy consumption but the obtained measurement is not very accurate and can be affected by numerous parameters, such as by the nature of the elements separating the two primary radio modules. However, in the approach phase, as described later on, this technique allows estimating a primary communication distance 300 by using only a small amount of energy.

It should also be noted that the primary radio module 120 enables the exchange of information with at least one other transceiver 110. For example, the primary radio module 120 may enable the establishment of a communication and of a synchronisation between the transceiver 110 and at least one other transceiver 110 of the same kind.

Once this primary distance value has been estimated, it can be compared with a secondary communication distance 300. This comparison then allows activating, or not, the secondary radio module 130 of the transceiver 110.

According to one embodiment, the secondary radio module 130 may consist of or comprise a radio module with a wide frequency band, also called UWB, standing for "Ultra-Wideband". In the present application, a radio module with a wide frequency band refers to a radio module configured to operate over a frequency band ranging from a few megahertz to a few tens gigahertz, for example from 3,000 MHz and/or up to 11,000 MHz.

Ultra Wideband (UWB) is a radio modulation technique based on the transmission of pulses of very short duration, often less than a nanosecond. Unlike conventional radio systems based on narrow frequency bands, UWB spreads the communication over a very wide frequency spectrum. The communication spectrum has a bandwidth to centre frequency ratio of at least 20%. The emitted power spread over a wide frequency band leads to a very flat and very low radiation spectrum level with the same amplitude level as the "background noise" radio radiation. The UWB radio pulses being very short and synchronised over a very wide frequency band, they are detectable in the "background noise". This leads to radios with a very low emission power and very low sensitivity to external disturbances.

Via this type of secondary radio module, it is then possible to estimate a secondary distance value with a better accuracy than that obtained during the estimation of the primary distance value.

Thus, if the estimated primary distance value is less than the secondary communication distance 400, then the transceiver 110 will use its secondary radio module 130 to estimate a secondary distance value between its secondary radio module 130 and the secondary radio module 130 of the other transceiver 110. Advantageously, this distance measurement is carried out via the measurement of the transmission time, also called time-of-flight, of a signal transmitted from its secondary radio module 130 and sent to the secondary radio module 130 of the other transceiver 110.

According to one embodiment, this distance measurement is performed by a transmission of a signal from the secondary radio module 130 of a first transceiver 111, called initiator, to the secondary radio module 130 of a second transceiver 112, called responder. When the responder receives the signal, it sends it back to the initiator. The measurement of the round-trip time plus a predetermined, and preferably fixed, processing time allows calculating the time-of-flight of the signals between the two transceivers. The distance is calculated by the light velocity wave transmission formula.

In a clever manner, this distance measurement technique is very advantageous since it allows obtaining a very high measurement accuracy, greater than the so-called RSSI previous technique. However, this measurement technique is more energy-consuming, so the invention activates this measurement only when a measurement accuracy is necessary, i.e. when the transceivers 110 are close enough to one another to require this accuracy.

According to an advantageous and preferred embodiment, an estimation of the primary distance value consumes less energy than an estimation of the secondary distance value.

Afterwards, if the estimated secondary distance value is less than a predetermined notification distance 500, then the transceiver 110 is configured to estimate a degree of nearness. This degree of nearness may according to one embodiment correspond to the crossing of a predetermined approach distance between the transceiver and the other transceiver. According to another embodiment, the degree of nearness may also correspond to a time interval since the crossing of this predetermined approach distance.

According to another embodiment, this degree of nearness may correspond to a level of approach, i.e. to a value inversely proportional to the distance separating the two transceivers 110.

When this degree of nearness between two transceivers is above a predetermined threshold, then at least one of the two transceivers, and preferably both are configured to notify a proximity detection.

Thus, and according to one embodiment, if the estimated secondary distance value is less than a predetermined notification distance 500, the transceiver 110 is configured to notify a proximity detection. Indeed, as soon as the distance between the two transceivers 110 is below a predetermined threshold, each transceiver 110 will notify that they are too close to each other. Advantageously, this notification is intended for the wearers of the transceivers 110. This notification may be in various forms such as sound, vibration, light signal, etc. The notification may further comprise the emission of a radio signal to another device, such a device may be the second transceiver located at too small a distance, another one of the plurality of transceivers, or another device able to produce an indication on nearness to a user. Preferably, the latter is the wearer of the transceiver 110. For example, the transceiver 110 notifies the nearness, in the form of sending a signal, a telecommunications device, such as a smartphone, and the latter provides an indication to its wearer, such as the ringing of the telephone or a vibration.

In a clever manner, the transceiver 110 comprises at least one human-machine interaction module 160. It is this human-machine interaction module 160 that has the function of generating said notification. Thus, this module 160 may comprise for example a vibrator, a loudspeaker or a light source, etc.

As illustrated in FIG. 1, the transceiver 110 further comprises an electric battery 150 intended to power at least part of the elements of the transceiver 110, in particular and for example, at least one microprocessor 140 able to execute a method 600 described hereinafter. In particular, the transceiver 110 preferably comprises a memory, advantageously at least partially non-volatile, able to store instruction data, instructions carrying out the method 600 when they are executed by the microprocessor 140.

Finally, in order to make the transceiver 110 portable, the latter may comprise a fastening device or be included in a device intended to be worn by a user.

Figure 2:
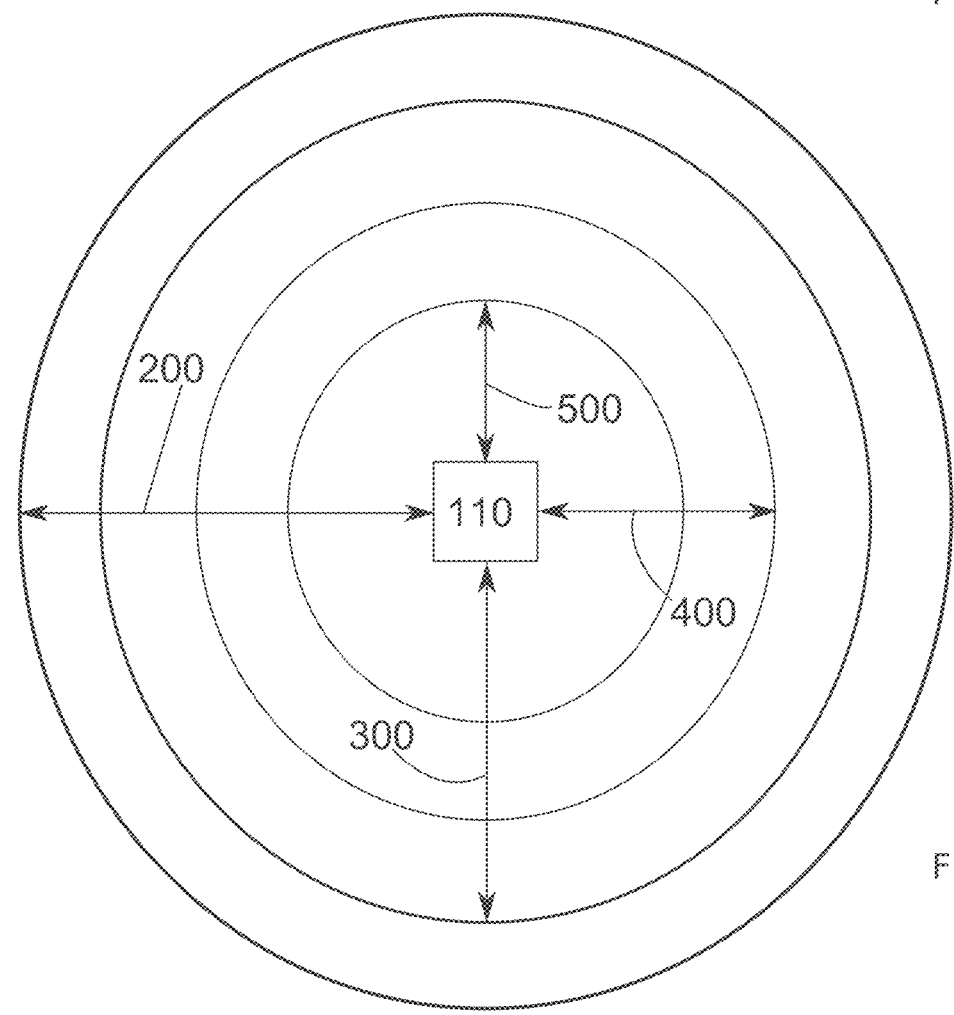
FIG. 2 represents a transceiver according to an embodiment of the present invention.

FIG. 2 illustrates a transceiver 110 according to an embodiment of the present invention. In this figure, the primary communication distance 300 has been illustrated, as well as the secondary communication distance 400, and the notification distance 500. A locating distance 200 should also be noted, this is the distance below which the transceivers can detect each other. The role of these different distances will be described more specifically hereinafter.

It should be noted that, preferably, the locating distance 200 is greater than the primary communication distance 300.

Advantageously, the primary communication distance 300 is greater than the secondary communication distance 400.

In a clever manner, the secondary communication distance 400 is greater than the notification distance 500.

According to one embodiment, the locating distance is substantially equal to 50 m, the primary communication distance is substantially equal to 20 m, the secondary communication distance is substantially equal to 8 m and the notification distance is substantially equal to 2 m.

Figure 3:
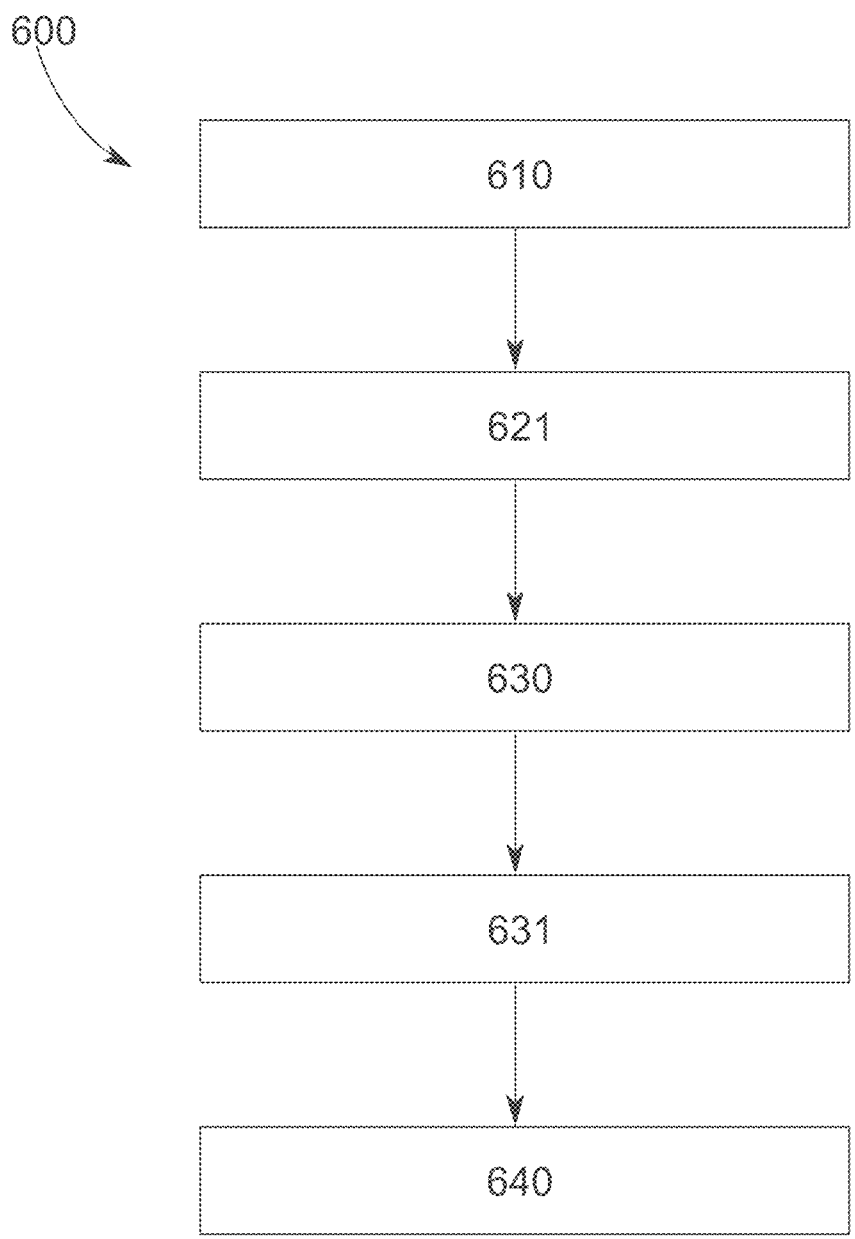
FIG. 3 represents some steps of a proximity detection method according to an embodiment of the present invention.

FIG. 3 illustrates, as example and according to one embodiment, a method 600 according to the present invention. This method 600 is a method for detecting proximity between a first transceiver 111 as previously described and at least one second transceiver 112 also as previously described.

This method 600 comprises at least the following steps, preferably implemented by the first transceiver 111:

detection 610 by the primary radio module 120 of the first transceiver 111 of the primary radio module 120 of the second transceiver 112; this detection is made possible because each primary radio module 120 is in its radio environment discovery mode, so as to regularly emit a signal and seek to receive a signal; the distance from which the detection 610 is possible is called the locating distance 200; the distance required for the establishment of a communication is called primary communication distance 300; by "detection", it should be understood the reception and/or the emission of at least one signal comprising for example an identifier, and possibly a communication protocol, etc.;

as soon as the distance between the primary radio modules 120 is less than or equal to the primary communication distance 300, the establishment 620 of a primary, preferably bidirectional, communication of the primary radio module 120 of the first transceiver 111 with the primary radio module 120 of the second transceiver 112; during this primary communication, identifiers, also communication protocols for example, and still possibly measured distances, can be exchanged. Advantageously, this primary communication enables the establishment of a communication synchronisation that can be used later on during a secondary communication between the secondary radio modules 130 for example; preferably, this primary communication enables pairing between the first transceiver 111 and the second transceiver 112, this pairing can be used later on during a secondary communication between the secondary radio modules 130 for example; this primary communication then enables the estimation of the distance between the considered primary radio modules 120;

when the primary radio module 120 of the first transceiver 111 and the primary radio module 120 of the second transceiver 112 approach each other by getting under the primary communication distance 300, the estimation 621, by the first transceiver 111, of the primary distance value between the primary radio module 120 of the first transceiver 111 and the primary radio module 120 of the second transceiver 112. As indicated before, this distance measurement is advantageously carried out via a measurement of the strength of at least one signal received by the primary radio module 120 of the first transceiver 111 and emitted from the primary radio module 120 of the second transceiver 112;

afterwards, if the estimated primary distance value falls below the secondary communication distance 400 between the secondary radio module 130 of the first transceiver 111 and the secondary radio module 130 of the second transceiver 112:

then, there is detection, by the secondary radio module 130 of the first transceiver 111 of the secondary radio module 130 of the second transceiver 130. Indeed, when the distance between two primary radio modules 120 is close enough, the secondary radio modules 130 are then used to estimate with greater accuracy the distance separating them;

there is then the establishment 630 of a secondary, preferably bidirectional, communication of the secondary radio module 130 of the first transceiver 111 with the secondary radio module 130 of the second transceiver 112; during this secondary communication identifiers, and also communication protocols for example, and still possibly measured distances, can be exchanged. Advantageously, this secondary communication is enabled by the prior synchronisation of the first transceiver 111 with the second transceiver 112 via the primary communication; preferably, this secondary communication is enabled by the prior pairing of the first transceiver 111 with the second transceiver 112 via the primary communication; it should be noted that according to one embodiment, the establishment of the secondary communication does not necessarily interrupt the primary communication. Advantageously, the primary communication and the secondary communication are configured to operate in parallel with one another; according to another embodiment, the establishment of the secondary communication, interrupts the primary communication, and preferably vice versa;

afterwards, this secondary communication allows the estimation 631, by the first transceiver 111, of the secondary distance value between the secondary radio module 130 of the first transceiver 111 and the secondary radio module 130 of the second transceiver 112; as described before, this measurement of the secondary distance value is carried out via a measurement of the transmission time of a signal transmitted from the secondary radio module 130 of the first transceiver 111 to the secondary radio module 130 of the second transceiver 112;

afterwards, if the secondary distance value is less than a predetermined notification distance 500, then the degree of nearness is estimated, by the first transceiver 111, then a proximity detection is notified 640, by the first transceiver 111, if the degree of nearness is greater than a predetermined threshold.

According to a preferred embodiment, each transceiver 110 of the plurality of transceivers 110 is configured to carry out the steps of said method 600. In particular, the second transceiver 112 is configured to perform the same actions as the first transceiver 111, and in particular to estimate the primary and secondary distance values, preferably under the same conditions. It should be noted that preferably the first transceiver 111 and the second transceiver 112 exchange data with each other when they are within communication range, preferably at least within primary communication range, i.e. at a distance from each other less than or equal to the primary communication distance 300.

This method 600 will now be described according to an embodiment throughout FIGS. 4 to 8.

In general, it is advantageous that at least the first transceiver 111, but preferably that all of the plurality of transceivers, be in the listen and search mode by default. However, this state is not very energy-consuming to the extent that it advantageously uses only the primary radio modules.

Figure 4:
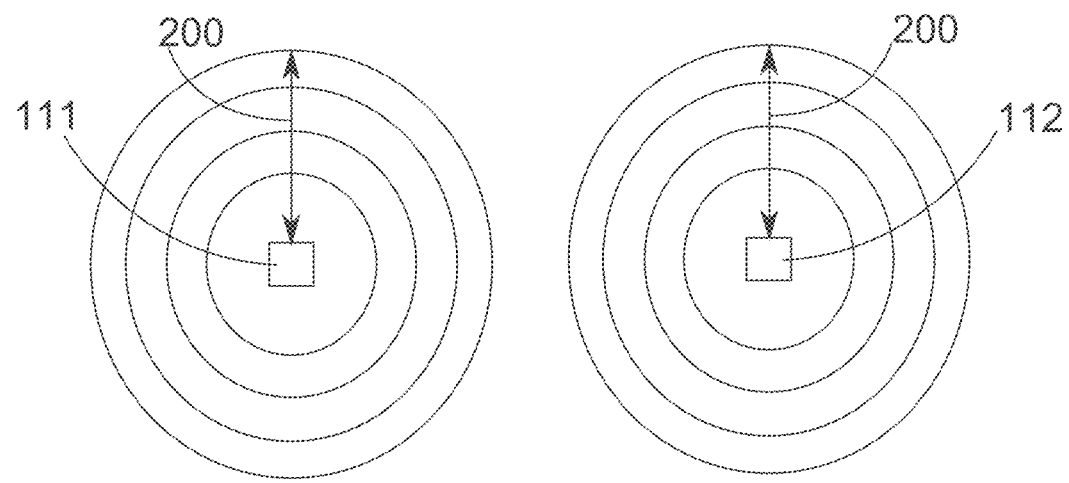
FIG. 4 represents a first transceiver and a second transceiver at a locating distance according to an embodiment of the present invention.

In FIG. 4, the first transceiver 111 and the second transceiver 112 are separated from each other by a distance such that they cannot locate one another. Each is then in the listen and search mode. Each primary radio module 120 emits a signal and is waiting for a reply from another primary radio module 120.

Figure 5:
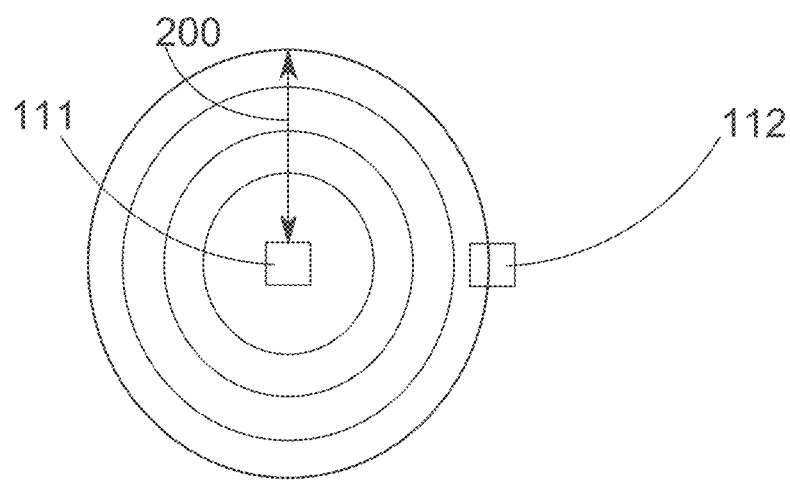
FIG. 5 represents a first transceiver and a second transceiver spaced apart from each other according to an embodiment of the present invention.

In FIG. 5, the first transceiver 111 and the second transceiver 112 are close enough so that they detect each other. Indeed, the distance separating them is less than or equal to the locating distance 200. In this situation, each of the primary radio modules 120 receives a notification from the other one indicating its presence.

According to one embodiment, when the distance separating the first transceiver 111 and the second transceiver 112 is less than or equal to the locating distance 200, the two primary radio modules 120 see each other and can estimate the distance separating them, preferably by RSSI-type measurement. At this distance, the first transceiver 111 and the second transceiver 112 do not communicate with each other. Each primary radio module 120 detects, "sees", the signal emitted by the other one. This signal is comparable to the signal of a simple beacon for example.

It should be noted that the initiation of the estimation of the primary distance value can be triggered as soon as a transceiver detects another one; this can, for example, allow this transceiver to monitor the evolution of the distance separating it from another transceiver. In such a phase, it is not necessarily mandatory for the two transceivers to communicate. Alternatively, it is also possible to start with a communication of the two transceivers, as soon as they are within communication range, and to carry out the distance measurement only after a certain time or, simply, when the distance falls below a predetermined threshold.

Figure 6:
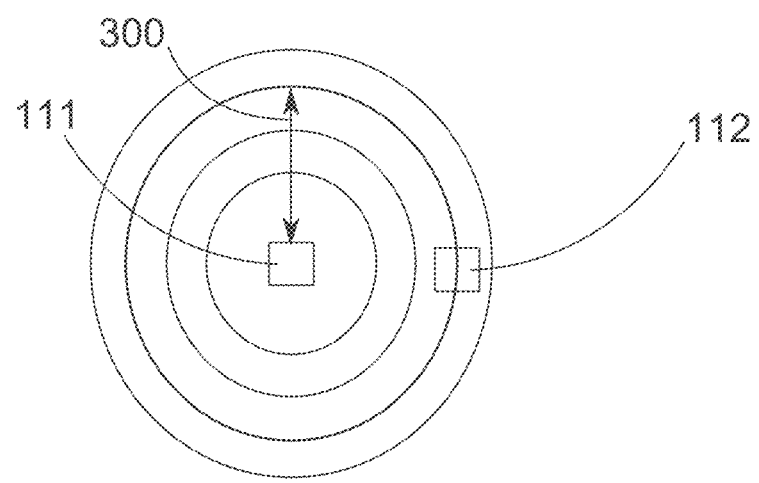
FIG. 6 represents a first transceiver and a second transceiver located at a primary communication distance according to an embodiment of the present invention.

In FIG. 6, the primary distance value separating the first transceiver 111 and the second transceiver 112 is less than or equal to the primary communication distance 300. Preferably, based on this primary communication distance 300, each transceiver 110 amongst the first 111 and the second 112 ones, uses its primary radio module 120 to communicate and preferably to estimate its distance with the other. Advantageously, only one can measure this distance and transmit it to the other one via their primary communication.

According to one embodiment, when the distance separating the first transceiver 111 and the second transceiver 112 is less than or equal to the primary communication distance 300, the two primary radio modules 120 are not simply in the beacon mode like before, they do not only "see". They switch into the communication mode and they exchange data to prepare the next step, in particular they prepare the time synchronisation to allow the future establishment of the secondary communication, and the measurements of distances by time-of-flight.

Figure 7:
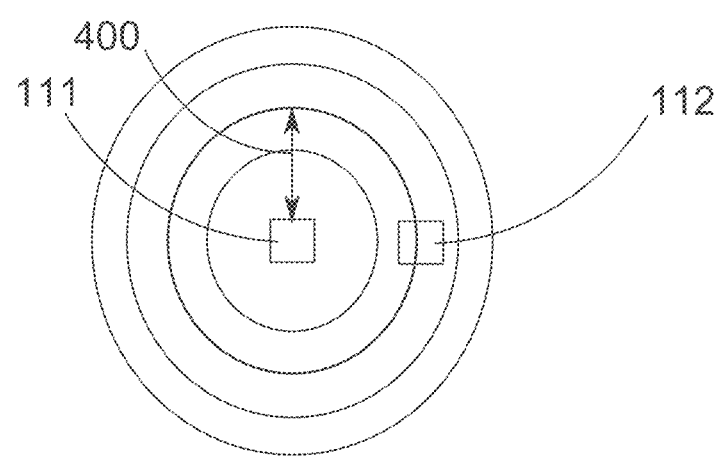
FIG. 7 represents a first transceiver and a second transceiver located at a secondary communication distance according to an embodiment of the present invention.

In FIG. 7, the first transceiver 111 and the second transceiver 112 continue to approach each other and cross the secondary communication distance 400. At this distance, their secondary radio module 130 will actually be preferably used to estimate the distance separating them. Indeed, given the fact that the two transceivers 111 and 112 are increasingly close, it is necessary to obtain a more accurate value of their actual distance. Based on this secondary communication distance 400, the secondary radio modules 130 establish a communication therebetween. Advantageously, the distance separating them is estimated by at least one of the two elements. The transceiver is transmitted to the other transceiver via its primary radio module, i.e. via the primary communication. Thus, the measured distance is found by the secondary communication, and this value may for example be exchanged between the transceivers via the primary communication.

Figure 8:
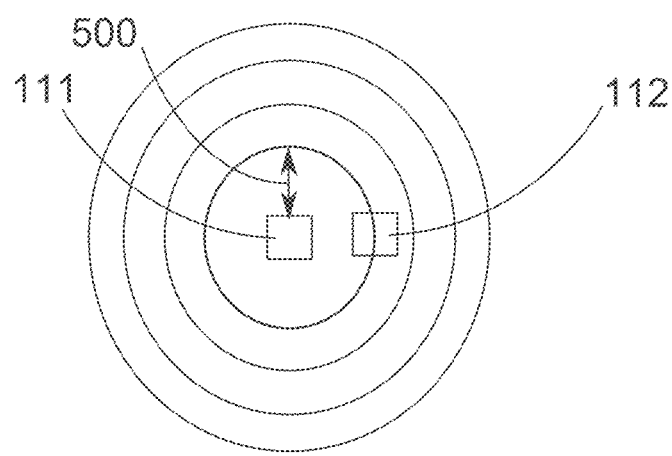
FIG. 8 represents a first transceiver and a second transceiver located at a notification distance according to an embodiment of the present invention.

In FIG. 8, the distance separating the first transceiver 111 and the second transceiver 112 is less than or equal to the notification distance 500. Since the two transceivers are too close to each other, their wearers are notified thereon so that they can for example move away again.

When the transceivers 111 and 112 move away, the process is performed in the reverse way. Indeed, first, the secondary distance value is less than the notification distance 500, then by moving away, the secondary distance value increases and becomes greater than the notification distance 500.

Then, when the secondary distance value exceeds the secondary communication distance 400, the two secondary radio modules 130 stop communicating with each other, and the measurement of the primary distance value is performed again, by using the two primary radio modules 120.

According to one embodiment, the spatial area located between the locating distance 200 and the primary communication distance 300 is called locating area.

According to one embodiment, the spatial area located between the primary communication distance 300 and the secondary communication distance 400 is called primary communication area.

According to one embodiment, the spatial area located at a distance less than or equal to the secondary communication distance 400 is called secondary communication area.

Finally, according to one embodiment, a spatial area located at a distance less than or equal to the notification distance 500 is called notification area.

Thus, when the second transceiver 112 is in one of these areas of the first transceiver 111, then the first transceiver 111 is also in the same corresponding area of the second transceiver 112.

Thus, the first and second transceivers simultaneously cross the respective areas of the other.

According to one embodiment, the locating area defines a shell around the primary, secondary communication and notification areas.

According to one embodiment, the primary communication area defines a shell around the secondary communication and notification areas.

According to one embodiment, the secondary communication area defines a shell around the notification area.

Advantageously, when the second transceiver 112 is in the locating area of the first transceiver 111, each one locates the other one.

Preferably, when the second transceiver 112 is in the primary communication area of the first transceiver 111, the primary communication is established and the primary distance value is estimated.

Advantageously, when the second transceiver 112 is in the secondary communication area of the first transceiver 111, the secondary communication is established and the secondary distance value is estimated, and preferably the primary communication is maintained to further transmit the estimated secondary distance value from the first transceiver 111 to the second transceiver 112.

According to one embodiment, when the second transceiver is in the notification area of the first transceiver, the first transceiver 111 estimates a degree of nearness and if this level is greater than a predetermined threshold, the first transceiver 111 notifies a proximity detection, and identically, the second transceiver 112 estimates a degree of nearness and if this level is greater than a predetermined threshold, the second transceiver 112 notifies a proximity detection, and preferably the secondary communication is maintained to continue the estimation of the secondary distance value, and preferably the primary communication is maintained to further transmit the estimated secondary distance value from the first transceiver 111 to the second transceiver 112.

Figure 9:
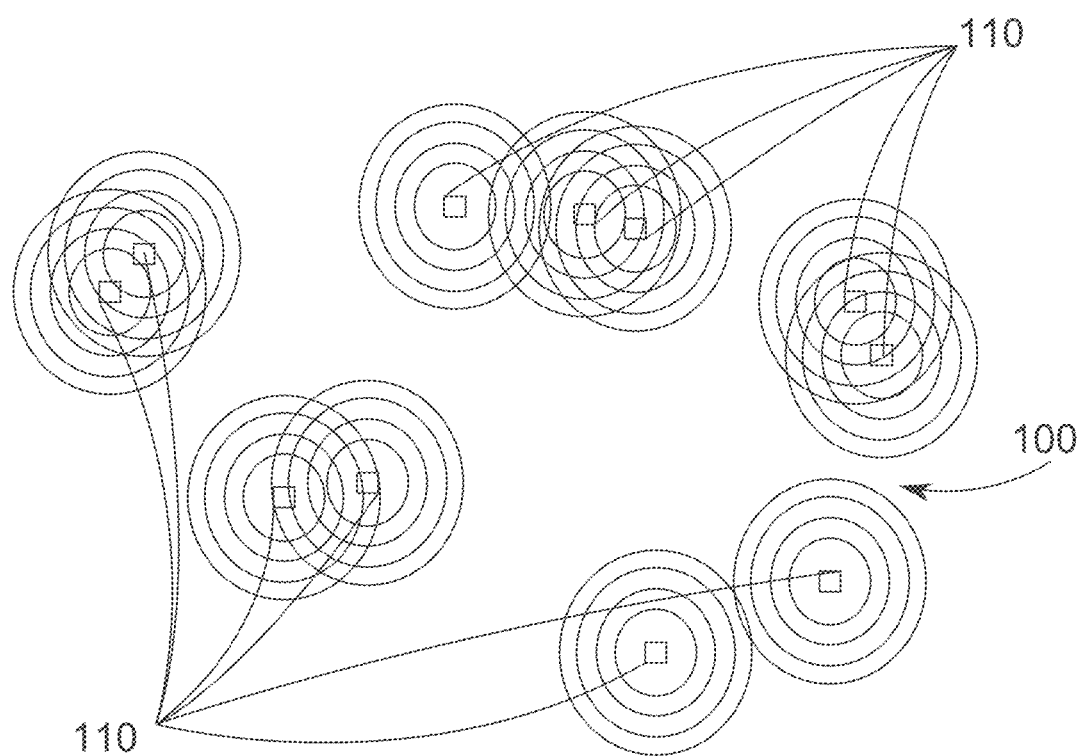
FIG. 9 represents a system according to an embodiment of the present invention.

FIG. 9 illustrates a system 100 according to an embodiment of the present invention. Advantageously, this system 100 is a system for detecting proximity between at least one first transceiver 111 and at least one second transceiver 112.

This system 100 may comprise a plurality of transceivers 110 to which belong the first transceiver 111 and the second transceiver 112. This system 100 is configured so that each transceiver 110 of the plurality of transceivers 110 can estimate its proximity to at least part of the other transceivers 110 of the plurality of transceivers 110, and preferably at any time.

This system 100 enables each wearer of a transceiver 110 to be notified as soon as it approaches another wearer at a predetermined distance.

The use of two methods for measuring the distance via two radio modules with different technologies allows in a first phase estimating the distance in an uncertain manner but with a low energy consumption, then in a second phase accurately estimating the distance but this time with a higher energy consumption.

The present invention finds particular application compliance with social distances. Indeed, the present invention allows informing the users when they are too close to each other, and thus enables them to keep safety distances, for example in the case of a transmission of a virus by positions.

According to one embodiment, in a given space, each person is equipped with a transceiver according to the present invention. Hence, this transceiver defines a kind of individual, and of course invisible, "Security Bubble".

According to one embodiment, these "Security Bubbles" are built based on hyperfrequency radio pulses of very low power level. Each "Security Bubble" automatically interacts with the neighbouring transceivers. It should be noted that the previously described distances can be adjusted individually and thus the diameter of each "Security Bubble" can therefore be adjusted. It should be noted that the accuracy of this diameter is preferably a few centimetres.

According to one embodiment, when two transceivers remain sufficiently remote, they interact to verify their relative distance.

When two transceivers are too close to each other, each collides with the "Security bubble" of the other and a notification, such as an alarm for example, informs both wearers.

According to an operating mode called "idle mode", without being close to another transceiver, each transceiver is in "discovery" mode. It occasionally listens to see whether another device is close. For this purpose, it uses the RSSI function of a BLE-type primary radio module. It wakes up when another person wearing a similar transceiver approaches. As soon as two transceivers are in this first contact level, i.e. at a locating distance for example of about 10 m to 20 m, they establish a primary communication, preferably in BLE, and are synchronised. For example, the "discovery" mode may be a BLE protocol in which the primary radio module regularly sends data packets so that any receiver of the plurality of transceivers around it identifies it and may possibly communicate with it.

Below this locating distance, the transceiver measures, continuously and in real-time, at least the distance separating it from another transceiver remote therefrom by a distance less than the locating distance, preferably this measurement is of the RSSI type as long as the distance separating the considered two transceivers is not less than or equal to the secondary communication distance.

As long as this measured distance is less than the primary communication distance and greater than the secondary communication distance, then the measurement of the distance is ensured by the primary radio modules via the so-called RSSI technique.

As soon as this distance is less than or equal to the secondary communication distance, the measurement of the distance is ensured by the secondary radio modules, and this measurement is transmitted between the transceivers involved by the primary radio modules. Thus, this distance measurement is for example performed ten times per second by UWB radio communication by means of the secondary radio modules, while using a synchronisation of the communications ensured by the BLE-type primary radio modules.

When the distance between two transceivers falls below a predefined limit, at the notification distance, then a notification is generated if the estimated degree of nearness is above a predetermined threshold.

Advantageously, each transceiver performs this succession of operations with all of the other transceivers of the plurality of transceivers worn by persons present around each wearer. Indeed, while the transceiver is already in primary or secondary communication with another transceiver, it can also be in discovery mode while being in primary or secondary communication with yet another transceiver. Thus, each wearer is surrounded by an invisible "Security Bubble" which immediately informs him when one or more other wearers enter into this bubble.

The invention is not limited to the previously-described embodiments and extends to all of the embodiments covered by the claims.

LIST OF REFERENCE SIGNS

100 Proximity detection system
110 Portable transceiver
111 First transceiver
112 Second transceiver
120 Primary radio module
121 Antenna of the primary radio module
130 Secondary radio module
131 Antenna of the secondary radio module
140 Microprocessor
150 Battery
160 Human/Machine interaction module
200 Locating distance
300 Primary communication distance
400 Secondary communication distance
500 Notification method
600 Proximity detection method
610 Detection by the primary radio module of the first transceiver of the primary radio module of the second transceiver
620 Primary communication between the first transceiver and the second transceiver via their respective primary radio module
621 Estimation of a primary communication distance between the first transceiver and the second transceiver
630 Secondary communication between the first transceiver and the second transceiver via their respective secondary radio module
631 Estimation of a secondary communication distance between the first transceiver and the second transceiver
640 Notification of a detected proximity

The invention claimed is:

1. A proximity detection system between at least a first transceiver and at least a second transceiver, the first transceiver and the second transceiver each comprising at least one primary radio module and one secondary radio module, the system wherein:

the primary radio module of the first transceiver is able to communicate with the primary radio module of the second transceiver, according to a first frequency band and according to a first amplitude;

the secondary radio module of the first transceiver is able to communicate with the secondary radio module of the second transceiver, according to a second frequency band, different from the first frequency band, and according to a second amplitude, different from the first amplitude;

the first transceiver and the second transceiver being configured:

when the primary radio module of the first transceiver and the primary radio module of the second transceiver come closer to each other, falling below a primary communication distance, to estimate a primary distance value between the primary radio module of the first transceiver and the primary radio module of the second transceiver from a measurement of the strength of at least one signal received by the primary radio module of the first transceiver from the primary radio module of the second transceiver; and if the estimated primary distance value falls below a secondary communication distance between the secondary radio module of the first transceiver and the secondary radio module of the second transceiver, to:

estimate a secondary distance value between the primary radio module of the first transceiver and the primary radio module of the second transceiver from at least a measurement of the transmission time of a signal transmitted from the secondary radio module of the first transceiver to the secondary radio module of the second transceiver; and, If the estimated secondary distance value is less than a predetermined notification distance, to estimate a degree of nearness, and notify a detection of proximity if the degree of nearness exceeds a predetermined threshold, and wherein the degree of nearness comprises at least one of the following parameters: a time interval since the crossing of a threshold distance, the crossing of a threshold distance.

2. The system according to claim 1, wherein the first frequency band has a width less than a width of the second frequency band.

3. The system according to claim 1, wherein the first frequency band has a width and wherein the second frequency band has a width, the ratio between the width of the second frequency band and the width of the first frequency band is greater than 50, preferably 100 and advantageously 250.

4. The system according to claim 1, wherein the first amplitude is greater than the second amplitude.

5. The system according to claim 1, wherein the ratio between the first amplitude and the second amplitude is greater than 10, preferably 20 and advantageously 40.

6. The system according to claim 1, wherein the communication between the secondary radio module of the first transceiver and the secondary radio module of the second transceiver is a synchronised communication, the synchronisation of such synchronised communication being performed at least partly by the primary radio module of the first transceiver and by the primary radio module of the second transceiver.

7. The system according to claim 1, wherein the estimated secondary distance value is transmitted to the second transceiver from the primary radio module of the first transceiver to the primary radio module of the second transceiver.

8. The system according to claim 1, wherein the first transceiver is configured, when the estimated primary distance value falls below the secondary communication distance between the secondary radio module of the first transceiver and the secondary radio module of the second transceiver, to stop the estimation of the primary distance value.

9. A transceiver configured to detect a proximity distance with at least a second transceiver from a multitude of transceivers, the transceiver comprising at least:
- a primary radio module configured to communicate with at least a primary radio module of the second transceiver according to a first frequency band and according to a first amplitude;
- a secondary radio module configured to communication with at least a secondary radio module of the second transceiver according to a second frequency band, different from the first frequency band, and according to a second amplitude, different from the first amplitude;

the transceiver being configured:
- when its primary radio module and the primary radio module of the second transceiver come closer to each other, falling below a primary communication distance, to estimate a primary distance value between the primary radio module of the first transceiver and the primary radio module of the second transceiver from a measurement of the strength of at least one signal received by the primary radio module of the first transceiver from the primary radio module of the second transceiver; and
- if the estimated primary distance value falls below a secondary communication distance between its secondary radio module and the secondary radio module of the second transceiver, to:
  - estimate a secondary distance value between its primary radio module and the primary radio module of the second transceiver from at least a measurement of the transmission time of a signal transmitted from its secondary radio module to the secondary radio module of the second transceiver; and,
  - if the estimated secondary distance value is less than a predetermined notification distance, to estimate a degree of nearness, and notify a detection of proximity if the degree of nearness exceeds a predetermined threshold, the degree of nearness comprising at least one of the following parameters: a time interval since the crossing of a threshold distance, the crossing of a threshold distance.

10. The transceiver according to claim 9, comprising at least a human-machine interaction module configured to allow for notification of proximity detection, said human-machine interaction module comprising at least one from: a vibration module, a sound module, a light module, etc.

11. The transceiver according to claim 9, comprising at least a fastening device configured to allow fastening the transceiver on a user.

12. A bracelet device comprising at least one transceiver according to claim 9.

13. A method for detecting proximity between a first transceiver and at least a second transceiver, the first transceiver and the second transceiver each comprising at least a primary radio module and a secondary radio module, the primary radio module of the first transceiver being configured to communicate with at least the primary radio module of the second transceiver according to a first frequency band and according to a first amplitude, the secondary radio module of the first transceiver being configured to communicate with at least the secondary radio module of the second transceiver according to a second frequency band, different from the first frequency band, and according to a second amplitude, different from the first amplitude, the method comprising at least the following steps:
- detection by the primary radio module of the first transceiver of the primary radio module of the second transceiver;
- when the primary radio module of the first transceiver and the primary radio module of the second transceiver come closer to each other, falling below a primary communication distance, estimation, by the first transceiver, of a primary distance value between the primary radio module of the first transceiver and the primary radio module of the second transceiver from a measurement of the strength of at least one signal received by the primary radio module of the first transceiver from the primary radio module of the second transceiver;
- if the estimated primary distance value is less than a secondary communication distance between the secondary radio module of the first transceiver and the secondary radio module of the secondary transceiver, detection by the secondary radio module of the first transceiver of the secondary radio module of the second transceiver; then,
- estimation, by the first transceiver, of a secondary distance value between the secondary radio module of the first transceiver and the secondary radio module of the second transceiver from at least a measurement of the transmission time of a signal transmitted from the secondary radio module of the first transceiver to the secondary radio module of the second transceiver;
- if the estimated secondary distance value is less than a predetermined notification distance, estimation of a degree of nearness, by the first transceiver, and notification of a proximity detection, by the first transceiver, if the degree of nearness is greater than a predetermined threshold, the degree of nearness comprising at least one of the following parameters: a time interval since the crossing of a threshold distance, the crossing of a threshold distance.

14. A computer programme product comprising instructions, which when executed by at least a processor, executes at least the steps of the method according to claim 13.

* * * * *